United States Patent Office 3,182,927
Patented May 11, 1965

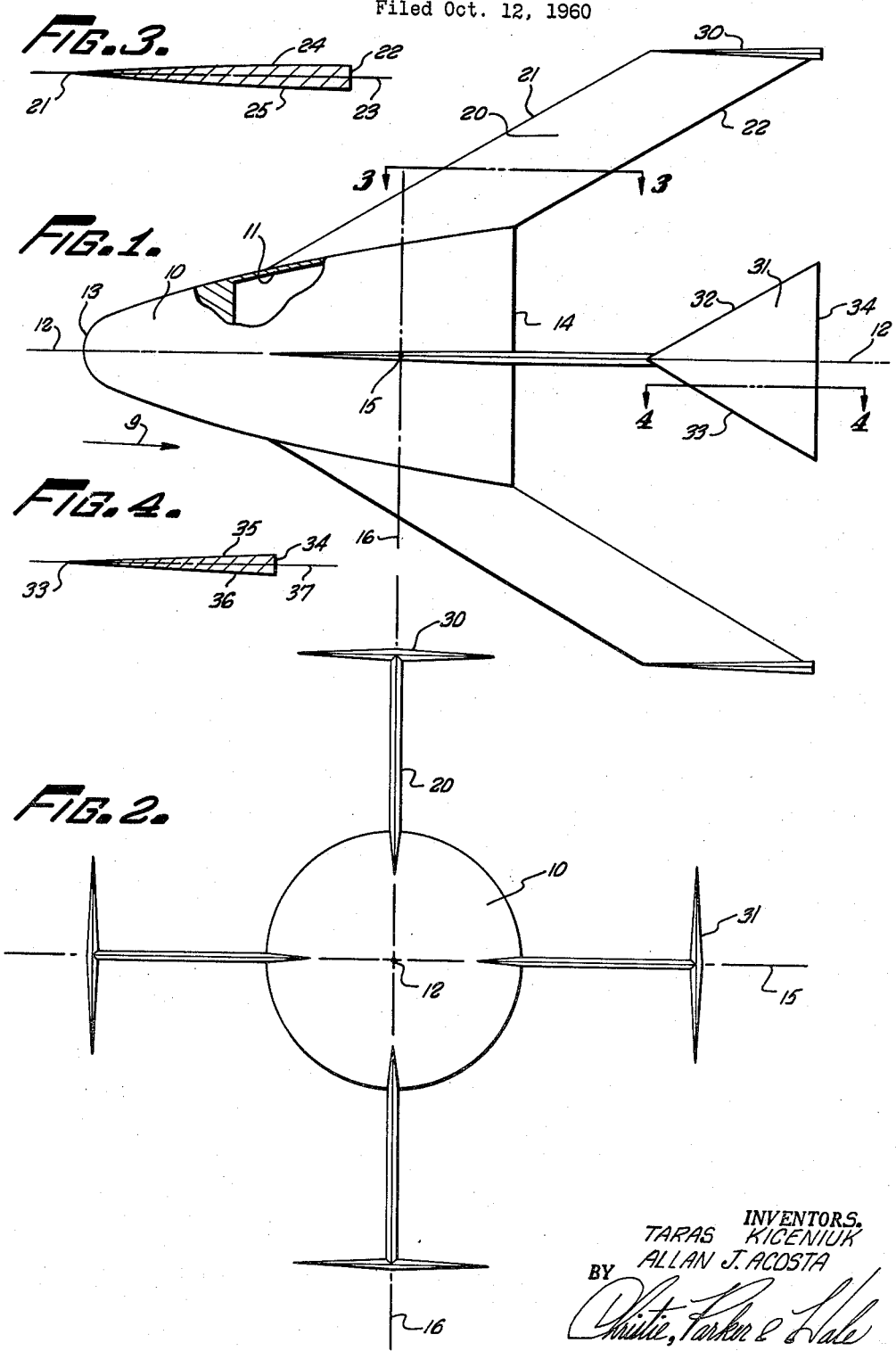

3,182,927
STABILIZED TEST HEAD
Taras Kiceniuk and Allan J. Acosta, Altadena, Calif., assignors to Edcliff Instruments, Monrovia, Calif., a corporation of California
Filed Oct. 12, 1960, Ser. No. 62,193
1 Claim. (Cl. 244—1)

The invention relates to stabilized test heads for use in testing flight characteristics of missiles, aircraft, torpedoes, and similar vehicles, and particularly to stabilization of the test head during flight in a desired orientation relative to the direction of travel of the vehicle.

Conventional testing of the flight characteristics of missiles and similar vehicles during flight through a fluid medium, whether fluid medium be air or water, or both air and water successively, includes the use of a test head mounted pivotally on the vehicle for sensing the angle of attack of the vehicle, that is, the angle between the longitudinal axis of the vehicle and its direction of flight, and for measuring ram pressure in the direction of flight of the vehicle, static pressure, temperature, and other physical quantities. The apparatus for sensing such quantities is mounted within the test head, and proper operation of this apparatus requires that the test head be stabilized during flight to maintain a reference axis of the test head coincident with the direction of flight of the test head or in some other desired orientation relative to the direction of flight of the test head.

This stabilization of the test head during flight of the vehicle has presented a problem in the art. Conventionally, aerodynamic stabilizing surfaces are included in the test head to effect the necessary stabilization. However, these conventional stabilizing surfaces have not proved satisfactory for all conditions of flight, particularly when the flight of the vehicle is successively through air and liquid mediums. At relatively low speeds, that is, on the the order of Mach 0.2 in air at sea level, or about one-half pound per square inch fluid dynamic pressure, conventional stabilizing surfaces have proved ineffective. This has occurred because the conventional stabilizing surfaces cannot be made large enough within size limitations to stabilize effectively at the low speeds involved. At high speeds, that is, in excess of Mach 0.9, ineffectiveness of conventional stabilizing surfaces arises from shock waves and boundary layer phenomena of the fluid medium through which the surfaces pass, which disrupt the stabilizing influence of such surfaces. Also, when flight is through water, cavitation about conventional stabilizing surfaces may render them ineffective.

The invention solves the above problems of effectively stabilizing a test head at both the low and high speeds above described and while it is passing through either air or water or both successively as the fluid medium of flight.

The apparatus of the invention includes the following: a test head housing having a longitudinal reference axis is mounted on a vehicle to be tested for pivotal movement of the housing about axes transverse both to the reference axis and to the general direction of flight. A plurality of vanes extend outwardly from the housing. Each vane has a wing mounted thereon which extends transversely to the vane and is spaced outwardly from the housing. Each wing is spaced from the pivot axes of the housing in the direction of the reference axis of the housing. Lack of the desired orientation of the reference axis of the housing during flight causes the vanes and wings to exert forces on the housing which tend to produce the desired orientation of the reference axis. Since the wings are spaced from the pivot axes of the housing, the stabilizing force attributable to each wing is applied to the housing as a moment, and this increases the stabilizing effect of such force.

The invention will be understood from the following description thereof taken in conjunction with the attached drawings, in which:

FIG. 1 is a side view, partially broken away, of a test head embodying the invention;
FIG. 2 is an end view looking from the left in FIG. 1;
FIG. 3 is an enlarged sectional view taken along the line 3—3 in FIG. 1; and
FIG. 4 is an enlarged sectional view taken along the line 4—4 in FIG. 1.

Referring now to FIG. 1, 10 represents the housing of a test head. The housing 10 has an internal cavity 11 in which conventional sensing instruments are mounted. The housing is an elongated member and has a central longitudinal axis 12 extending from its leading end 13 to its trailing end 14. The exterior surface of the housing is symmetrical about the central longitudinal axis 12 and may have the configuration of a parabola of revolution about such axis. The axis 12 serves as the reference axis which is to be maintained coincident with the direction of flight of the housing through a fluid medium, either air or water, or both successively. The general direction of flow of the fluid medium past the housing during flight is indicated with the arrow 9 in FIG. 1, and "upstream" and "downstream" are used herein with reference to such direction of fluid flow, so that the trailing end 14 of the housing may be said to be located downstream from the leading end 13 of the housing. In conventional use, the housing 10 is mounted pivotally on a vehicle to be tested for pivotal movement of the housing about a pair of mutually perpendicular transverse axes which each intersect the reference axis 12 at the same point and extend at right angles thereto, represented by the axes 15 and 16 in FIGS. 1 and 2. It is rotation of the housing about these transverse axes which is to be stabilized, and the test head is designed with reference to these axes, although the particular pivot mount structure for defining the transverse axes is conventional and does not form a part of the invention. This mounting of the housing for pivotal movement about the above described mutually perpendicular transverse axes may be effected with a gimbal mount which has mutually perpendicular pivot axes. For example, such a gimbal mount may comprise a pair of similar forked yokes disposed with their legs juxtaposed and their stems coaxial on opposite sides of a ring which surrounds the legs of both yokes and is pivotally attached to each leg of each yoke for pivotal movement of each yoke about an axis perpendicular to the common axis of the stems of the yokes. The yokes are oriented ninety degrees from each other about the common axis of their stems so that the pivot axes of the yokes are mutually perpendicular. The stem of one yoke is connected to the housing of the test head coaxially with the reference axis thereof and the stem of the other yoke is connected to a mast which extends from the vehicle to be tested and serves to support the test head on such vehicle. The point along the reference axis at which it is intersected by the transverse axes 15 and 16, referred to herein as the center of rotation of the housing, is indicated in FIG. 1 by the transverse axis 15 and is important with respect to the location and operation of the stabilizing surfaces, as explained below. It is to be understood that the exterior surface of the housing may have configurations other than a parabola of revolution and that the reference axis of the housing extending from its leading to trailing ends may not be an axis of symmetry of the housing.

Fixed to the housing 10 and extending outwardly therefrom are a plurality of vanes, such as the vane 20. The several vanes are disposed symmetrically about the reference axis 12. All of the vanes illustrated are identical, so that a description of one will suffice for all. The vane 20 is an elongated member having a leading edge 21 and a trailing edge 22. The leading edge 21 of the vane is sweptback relative to the reference axis 12, that is, it is inclined downstream at an acute angle to the reference axis 12 as it extends outwardly from the housing. The sweepback of the vane and its point of attachment to the housing are designed so that as much of the vane as possible and the outer end of the vane are located downstream from the center of rotation of the housing, for the reasons explained below. The trailing edge 22 of the vane 20 may be substantially parallel to the leading edge 21, but this is not necessary. The airfoil section of the vane 20 is shown in FIG. 3 and is a specially designed section which is non-cavitating in a liquid medium and which is adapted for hypersonic speeds in air. This airfoil section has an upper surface 24 and a lower surface 25 disposed on opposite sides of the chord line 23 of the section, the term "chord line" being used herein to mean a straight line extending between the centers of the leading and trailing edges of an airfoil section. The surfaces 24 and 25 are each defined by circular arcs having the same radius which lie in a plane perpendicular to the leading edge 21, as explained below. These circular arcs intersect at the leading edge 21, and at the trailing edge 22 they are tangent to a circumscribing parabola lying in a plane perpendicular to the leading edge 21 which has its vertex at the leading edge 21 and extends symmetrically to the trailing edge 22. Since the circular arcs lie in a plane perpendicular to the leading edge 21 of the vane, the mounting of the vane on the housing in sweptback orientation inclines these arcs relative to the direction of fluid flow 9 and thus presents to such fluid flow an airfoil section which is neither circular nor parabolic but rather ellipsoidal in configuration. This section has the advantageous non-cavitating properties of parabolic and wedge airfoil sections while also having the sharp leading edge of a wedge section which is advantageous for hypersonic speeds, but due to its arcuate curvature it has greater strength than a wedge section. Also, the double circular arc configuration is advantageous for manufacturing considerations, since circular arcs are easier to generate in a conventional machining process than parabolic arcs for the structure involved. The upper and lower surfaces 24 and 25 diverge arcuately outwardly from each other symmetrically with respect to the chord line 23 as they extend to the trailing edge 22 where the section is truncated with a surface extending transversely to the chord line 23 and equally on both sides thereof to form a blunt base on the section. The surfaces 24 and 25 diverge outwardly from the chord line 23 continuously from the leading edge 21 to the trailing edge 22 of the section and at no point converge toward the chord line 23. The chord plane of the vane, that is, the plane in which the chord lines of the vane lie, is planar.

In the preferred embodiment the vanes are mounted on the housing 10 in pairs with the vanes of each pair of vanes disposed on opposite sides of the housing and with the vanes of each pair aligned with each other so that their chord planes are coplanar and include the reference axis 12. In the preferred embodiment there are, as illustrated, two pairs of vanes, and the coplanar chord planes of each pair of vanes include not only the reference axis 12 but also one of the transverse axes, with each pair of vanes so including a different one of the transverse axes. Alternatively, the vanes may be rotationally displaced about the reference axis so that the common plane of the chord planes of each pair of vanes is dispaced an equal angular amount from a different one of the transverse axes. Moreover, there need not be pairs of vanes, and the plurality of vanes may consist of more or less than four vanes, such as three vanes spaced around the reference axis 12 at one hundred and twenty degree intervals from each other and with the chord plane of one such vane including one of the transverse axes. In the preferred embodiment all of the vanes are the same length, but this need not be the case, since where there are plural pairs of vanes, the vanes of each pair may be the same length, but as between pairs of vanes, each pair may have a different length.

Attached to the outer end of each vane is a wing, such as the wing 30 attached to the vane 20. The mounting of the wings on the end of each vane has the advantageous effect of increasing the effective aspect ratio of the vane to which the wing is attached. All the wings illustrated are identical so that a description of one will suffice for all. The wing 31 is shown in plan view in FIG. 1 and, as shown, has a pair of sweptback leading edges 32, 33 disposed symmetrically on opposite sides of the vane to which it is attached. The trailing edge 34 of the wing extends symmetrically on both sides of the vane. The airfoil section of the wing 31 is non-cavitating in liquid mediums and is also designed for hypersonic speeds in air. The airfoil section of the wing is shown in FIG. 4 and, as shown, is a wedge section having a planar upper surface 35 and a planar lower surface 36 which at the leading edge 33 intersect coincident with the chord line 37 of the section and diverge outwardly symmetrically on each side of the chord line 37 at a constant acute angle thereto as they extend to the trailing edge 34, which is a surface extending symmetrically on each side of the chord line 37 to form a blunt trailing edge. Alternatively, the airfoil section of the wings may be that described above for the vanes. As shown in FIG. 2, the upper and lower surfaces of the wing converge symmetrically on each side of the chord plane of the wing as they extend outwardly from the vane to which the wing is attached toward the leading edge or tip of the wing. The chord plane of the wing is planar and is perpendicular to the chord plane of the vane to which the wing is attached, although this need not be the case, since the wing may be given dihedral or polyhedral relative to a plane perpendicular to the chord plane of the vane to which the wing is attached. Each wing is spaced from the reference axis 12 in a direction perpendicular to such axis. As illustrated, this spacing is the same for all of the wings, but alternatively, the wings may be grouped into pairs with each wing of a pair located on a different side of the reference axis 12 and with the wings of each pair aligned, in which case the wings of each pair of wings are equally spaced from the reference axis 12, but as between pairs of wings, each pair may have a different spacing. The wings are also spaced a predetermined distance from the center of rotation of the housing in a direction parallel to the reference axis 12, this spacing being permitted by the sweptback orientation of the vanes on which the wings are mounted. As illustrated, this spacing of the wings from the center of rotation of the housing is downstream and is the same for all of the wings, but as described above in connection with the spacing of the wings from the reference axis, such spacing may be the same for each pair of wings but different as between pairs. The chord plane of each wing is oriented with zero angle of incidence relative to the reference axis 12 to reduce drag and minimize cavitation about the wings.

In operation, when the housing 10 pivots about one or both of the transverse axes 15 and 16 in such manner that its reference axis 12 is not coincident with its direction of flight, the wings on each side of the transverse axis, or axes, about which the housing has pivoted and the vanes not perpendicular to such transverse axis will thereby be inclined relative to the direction of flight of the housing, thus changing their angle of attack. As a consequence, lift forces are produced by such wings and vanes which, due to the sweptback configuration of the vanes from the center of rotation of the housing and the spacing of the wings downstream from such center of rotation, create a moment about the transverse axis of rotation. This moment tends to move the housing to reduce such angle of attack to a minimum and thus to produce coincidence between the reference axis 12 and the direction of flight of the housing. In this manner the housing is stabilized to maintain its reference axis coincident with its direction of flight. The wings are particularly effective in so stabilizing the housing because of the perpendicular spacing of their lift forces from the transverse axes about which such lift forces act. This results in such lift forces being applied to the housing as a moment, thus greatly increasing the stabilizing effect of the wings with very little increase in overall dimensions of the test head. The same effect results from the sweepback of the vanes, since to the extent the vanes are spaced downstream from the transverse axis about which their lift forces act, such lift forces are in similar manner applied to the housing as a moment. The greater this spacing of the wings and vanes from the transverse axes about which their lift forces act, the greater will be the moment, and hence the greater will be the stabilizing effect of such lift forces.

The sweepback of the leading edges of the vanes and the wings and their hypersonic airfoil sections reduce to a minimum the adverse effects of shock waves and boundary layer phenomena resulting from compressibility of air at transonic to hypersonic speeds.

We claim:

A test head for missiles and the like comprising a housing having a leading end and a trailing end with a reference axis extending between its leading and trailing ends, said housing to be pivotally mounted on a vehicle to be flight tested for pivotal movement of the housing about mutually perpendicular transverse axes which each intersect the reference axis at the same point and at right angles thereto, a plurality of elongated vanes fixed to the housing and extending outwardly therefrom, said vanes being spaced symmetrically about the reference axis of the housing and having a major portion spaced from the transverse axes in the direction of the reference axis, and a unitary wing on each vane with its chord plane extending transversely to the vane and spaced from the reference axis, each wing being spaced from the transverse axes in the direction of the reference axis, and each vane having a sharp leading edge which is sweptback and exterior surfaces which diverge outwardly continuously between the leading and trailing edges of the vane, said exterior surfaces of each vane being defined by a circular arc of the same radius on each side of the chord plane of the vane and lying in a plane perpendicular to the leading edge of the vane which arcs intersect at the leading edge of the vane and at the trailing edge of the vane are tangent to a parabola which circumscribes the arcs and which lies in the same plane as the arcs and has its vertex at the leading edge of the vane.

References Cited by the Examiner
UNITED STATES PATENTS 2,495,304   1/50   Wyckoff et al.
2,705,890   4/55   Klose _____ 73—189

FOREIGN PATENTS 921,287   1/47   France.

OTHER REFERENCES

Butz, J. S., Jr.: Bluntness Can Add Efficiency to Aircraft, Millile, in Aviation Week, pages 52, 53, June 24, 1957.

RICHARD C. QUEISSER, *Primary Examiner.*
CHARLES A. CUTTING, JOSEPH P. STRIZAK,
*Examiners.*